(12) United States Patent
Okamoto

(10) Patent No.: US 12,019,390 B2
(45) Date of Patent: Jun. 25, 2024

(54) TRANSMISSION MECHANISM, ROTATIONAL FORCE TRANSMISSION DEVICE, AND IMAGE FORMING APPARATUS

(71) Applicant: SHARP KABUSHIKI KAISHA, Sakai (JP)

(72) Inventor: Shohtaroh Okamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/988,737

(22) Filed: Nov. 16, 2022

(65) Prior Publication Data

US 2023/0152738 A1    May 18, 2023

(30) Foreign Application Priority Data

Nov. 17, 2021   (JP) .................................. 2021-186747
Nov. 17, 2021   (JP) .................................. 2021-186748

(51) Int. Cl.
*G03G 21/00* (2006.01)
*F16D 3/06* (2006.01)
(Continued)

(52) U.S. Cl.
CPC .......... *G03G 21/1647* (2013.01); *F16D 3/06* (2013.01); *F16D 7/042* (2013.01); *F16D 7/044* (2013.01);
(Continued)

(58) Field of Classification Search
CPC .......... G03G 15/2017; G03G 15/2053; G03G 21/1647; G03G 21/1685;
(Continued)

(56) References Cited

U.S. PATENT DOCUMENTS 1,828,370 A * 10/1931 Huddle ................... F16D 7/044
464/39
3,942,337 A * 3/1976 Leonard ................... F16D 7/08
464/36
(Continued)

FOREIGN PATENT DOCUMENTS

DE   102004038248 B3 * 3/2006 ............ B60T 13/746
EP       2594367 A1 * 5/2013 ......... A61B 17/8875
(Continued)

*Primary Examiner* — Robert B Beatty
(74) *Attorney, Agent, or Firm* — ScienBiziP, P.C.

(57) ABSTRACT

A rotational force transmission device includes a transmission mechanism disposed on an input gear, and a ratchet member disposed on an output gear. The transmission mechanism includes a first sleeve having a first interlocker, a second sleeve having a second interlocker that engages with the first interlocker with a rotation clearance in the circumferential direction, and a coil spring disposed between the first and second sleeves. When a drive source is stopped, the second sleeve can idly rotate within the rotation clearance between the first and second interlockers. The first sleeve has a first retainer, and the second sleeve has a second retainer engaging with the first retainer in the axial direction. The first sleeve, the second sleeve, and an urging member are unitized by the engagement of the first and second retainers.

7 Claims, 15 Drawing Sheets

(51) Int. Cl.
*F16D 7/00* (2006.01)
*F16D 7/04* (2006.01)
*G03G 15/20* (2006.01)
*G03G 21/16* (2006.01)

(52) U.S. Cl.
CPC . *G03G 15/2053* (2013.01); *G03G 2221/1657* (2013.01)

(58) Field of Classification Search
CPC .... G03G 2221/1639; G03G 2221/1657; F16D 3/06; F16D 3/52; F16D 3/66; F16D 7/04; F16D 7/042; F16D 7/044; F16D 7/048
USPC .......................................................... 399/330
See application file for complete search history.

(56) References Cited

U.S. PATENT DOCUMENTS

| | | | | |
|---|---|---|---|---|
| 5,907,756 | A | * | 5/1999 | Shirota .............. G03G 15/0868 222/DIG. 1 |
| 2007/0000746 | A1 | * | 1/2007 | Guyader ................... F16D 9/08 192/55.1 |
| 2009/0104998 | A1 | * | 4/2009 | Chuang ................... F16D 7/044 464/39 |
| 2018/0160621 | A1 | * | 6/2018 | Hammar ................. F16D 11/14 |
| 2018/0210390 | A1 | * | 7/2018 | Okuno ............... G03G 21/1676 |
| 2019/0031456 | A1 | * | 1/2019 | Sawashima ......... F16D 43/2024 |

FOREIGN PATENT DOCUMENTS

| | | | | |
|---|---|---|---|---|
| JP | 2019-026433 A | | 2/2019 | |
| JP | 2019026433 A | * | 2/2019 | ........... B65H 3/0669 |
| WO | WO-2018230744 A1 | * | 12/2018 | ......... G03G 15/0808 |

* cited by examiner

TRANSMISSION MECHANISM, ROTATIONAL FORCE TRANSMISSION DEVICE, AND IMAGE FORMING APPARATUS

CROSS REFERENCE OF RELATED APPLICATION

Japanese Patent Application No. 2021-186747, filed on Nov. 17, 2021, and Japanese Patent Application No. 2021-186748, filed on Nov. 17, 2021 are herein incorporated by reference.

BACKGROUND OF THE INVENTION

Field of the Invention

The disclosure relates to a transmission mechanism, a rotational force transmission device, and an image forming apparatus, and, in particular, relates to a transmission mechanism that is disposed between, for example, a first gear and a second gear disposed side by side on the same rotary shaft and transmits the toque of the first gear to the second gear, a rotational force transmission device including the transmission mechanism, the first gear, and the second gear and transmits toque to a detachable unit, and an image forming apparatus including the transmission mechanism or the rotational force transmission device.

Description of the Background Art

There is a known a rotational force transmission device that transmits driving force from a drive source to a rotary member of a seat conveyance device. The rotational force transmission device includes a first gear (first ratchet gear) provided with a first interlocker, a second gear (second ratchet gear) provided with a second interlocker that engages with the first interlocker, and an urging member that causes the first gear and the second gear to be urged against each other. The first gear and the second gear rotate in a first direction to transmit driving force from the drive source to the rotary member. The first interlocker has a first face where the first gear rotating in the first direction transmits the driving force to the second gear while the first and second interlockers are engaged. The first face tilts in a direction that allows the first interlocker to rotate in the first direction while the first or second interlocker retracts in a direction against the urging force of the urging member to disengage from the other interlocker. The first and second interlockers disengage before the torque on the first and second interlockers due to the driving force from the drive source exceeding the allowable torque that deforms or breaks the first or second gear.

In the conventional technique, ratchet gears are used as torque limiters to prevent damage to gears and other components. When the rotational force transmission device disclosed in the conventional technique is disposed on a part that transmits rotational force to a detachable unit such as a fusing unit detachable from the device body, at the time of installment of the detachable unit to the device body, there is a risk of damaging the gears due to an excessive load caused by the impact of the gear of the detachable unit and the gear of the rotational force transmission device meshing with each other. Relatively large force is required to incorporate the urging member into the body of the rotational force transmission device. In the conventional technique, the urging member, the gears, etc., are individually mounted, so that the gears must be mounted while the urging member is held down with large force. This makes assembly difficult.

An object of the disclosure is, therefore, to provide a novel transmission mechanism, a novel rotational force transmission device, and a novel image forming apparatus.

Another object of the disclosure is to provide a transmission mechanism, a rotational force transmission device, and an image forming apparatus that can be readily assembled and properly prevent damage to the gears when the detachable unit is installed.

SUMMARY OF THE INVENTION

According to a first aspect of the disclosure, a rotational force transmission device includes: a first gear and a second gear disposed side by side on a same rotary shaft, the first gear and the second gear rotating about the rotary shaft in a first direction by driving force from a drive source to transmit rotational force to a detachable unit; a transmission mechanism disposed on a side of the first gear adjacent to the second gear to rotate together with the first gear, the transmission mechanism comprising a first ratchet disposed at an end adjacent to the second gear; and a ratchet member disposed on a side of the second gear adjacent to the first gear to rotate together with the second gear, the ratchet member comprising a second ratchet at an end adjacent to the first gear, the second ratchet engaging with the first ratchet, wherein, the transmission mechanism comprises: a first sleeve disposed adjacent to the first gear and comprising a first interlocker; a second sleeve disposed adjacent to the second gear in a manner movable in an axial direction of the rotary shaft, the second sleeve comprising the first ratchet and a second interlocker, the second interlocker engaging with the first interlocker with a rotation clearance allowing movement in a circumferential direction of the rotary shaft by a predetermined distance; and a coil spring disposed between the first sleeve and the second sleeve, the coil spring urging the second sleeve toward the ratchet member by restoring force against compression, the coil spring urging the first sleeve and the second sleeve in a direction causing disengagement of the first interlocker and the second interlocker by restoring force against twisting, when a rotational load equal to or greater than a predetermined value is applied between the first ratchet and the second ratchet, the first ratchet and the second ratchet disengage as a result of the second sleeve moving away from the ratchet member against urging force of the coil spring, and when the drive source is stopped, the second sleeve is able to idly rotate in a second direction opposite to the first direction relative to the first sleeve by a circumferential distance corresponding to the rotation clearance formed between the first interlocker and the second interlocker by the urging force of the coil spring.

According to the first aspect, the ratchet member, the second sleeve, and the coil spring constitute a torque limiter mechanism, and the first sleeve, the second sleeve, and the coil spring constitute a buffer mechanism. Thus, damage to the gears when the detachable unit is locked can be appropriately prevented, and damage to the gears when the detachable unit is installed can be appropriately prevented.

According to the first aspect, the coil spring functions as a compression spring in the torque limiter mechanism and as a torsion spring in the buffer mechanism, that is, one coil spring is shared by both mechanisms. The second sleeve is shared by the torque limiter mechanism and the buffer mechanism. Therefore, it is possible to reduce parts, cost, and size.

According to a second aspect of the disclosure, which is dependent on the first aspect, one of the first interlocker and the second interlocker is a protrusion extending along the axial direction of the rotary shaft and having a length in the circumferential direction of the rotary shaft equal to a first width, the other one of the first interlocker and the second interlocker is a groove extending along the axial direction of the rotary shaft and having a length in the circumferential direction of the rotary shaft equal to a second width, the second width being larger than the first width, and the coil spring urges the first sleeve and the second sleeve to cause the protrusion to abut on one of two sides of the groove.

According to a third aspect of the disclosure, which is dependent on the first aspect, the first ratchet has a plurality of first tilt faces and a plurality of second tilt faces, the first tilt faces being disposed at predetermined intervals along the circumferential direction of the rotary shaft and tilting by a first tilt angle to the axial direction of the rotary shaft, the second tilt faces being disposed between the first tilt faces and tilting by a second tilt angle to the axial direction of the rotary shaft, the second tilt angle being larger than the first tilt angle, and the second ratchet has a plurality of third tilt faces and a plurality of fourth tilt faces, the third tilt faces tilting by the first tilt angle to the axial direction of the rotary shaft and engaging with the first tilt faces, respectively, the fourth tilt faces tilting by the second tilt angle to the axial direction of the rotary shaft and engaging with the second tilt faces, respectively.

According to a fourth aspect of the disclosure, which is dependent on the third aspect, the first tilt angle is within a range of 2 to 15 degrees, both inclusive.

According to a fifth aspect of the disclosure, which is dependent on the first aspect, the first sleeve comprises a first restrictor abutting on a first end of a wire rod constituting the coil spring in the circumferential direction of the rotary shaft to restrict a circumferential position of the first end, and the second sleeve comprises a second restrictor abutting on a second end of the wire rod constituting the coil spring to restrict a circumferential position of the second end.

According to a sixth aspect of the disclosure, which is dependent on the first aspect, the rotation clearance between the first interlocker and the second interlocker is equivalent to at least one pitch and no more than three pitches of the second gear.

According to a seventh aspect of the disclosure, an image forming apparatus includes: the rotational force transmission device according to the first aspect disposed on a body of the image forming apparatus, and a fusing unit removably disposed in the body and receiving rotational force from the rotational force transmission device.

According to an eighth aspect of the disclosure, a transmission mechanism is disposed between a first gear and a second gear and transmits rotational force of the first gear to the second gear, the first gear and the second gear being disposed side by side on a same rotary shaft, the transmission mechanism including: a first sleeve rotatable around the rotary shaft and comprising a first interlocker; a second sleeve disposed adjacent to the first sleeve in a manner rotatable around the rotary shaft and comprising a second interlocker engaging with a first interlocker with a rotation clearance allowing movement in a circumferential direction of the rotary shaft by a predetermined distance; and an urging member disposed between the first sleeve and the second sleeve and urging the first sleeve and the second sleeve in a direction causing the first interlocker and the second interlocker to disengage, wherein, the first sleeve comprises a first retainer, and the second sleeve comprises a second retainer engaging with the first retainer in an axial direction of the rotary shaft, and the first sleeve, the second sleeve, and the urging member are unitized by the first retainer and the second retainer engaging with each other.

In the eighth aspect, the first interlocker and the second interlocker are engaged with a clearance in the circumferential direction, and the first sleeve and the second sleeve are urged by the urging member in a direction that causes the first interlocker and the second interlocker to disengage. This allows the second sleeve to idly rotate relative to the first sleeve by the circumferential distance corresponding to the clearance. Therefore, the transmission mechanism functions as a buffer mechanism to alleviate the impact of, for example, meshing another gear with the second gear.

According to the eighth aspect, the transmission mechanism is unitized by disposing the urging member between the first sleeve and the second sleeve. Thus, the transmission mechanism can be readily assembled into the apparatus body.

According to a ninth aspect of the disclosure, which is dependent on the eighth aspect, the urging member is a coil spring, the urging member urges the first sleeve and the second sleeve in a direction causing the first interlocker and the second interlocker to disengage by restoring force against twisting, and the urging member urges the first sleeve and the second sleeve in a direction causing the first sleeve and the second sleeve to move away from each other in the axial direction of the rotary shaft by restoring force against compression.

According to a tenth aspect of the disclosure, which is dependent on the eighth aspect, one of the first retainer and the second retainer is an engagement claw extending in the axial direction of the rotary shaft, and the other one of the first retainer and the second retainer is a claw-receiving hole to which the engagement claw is fitted.

According to an eleventh aspect of the disclosure, which is dependent on the tenth aspect, a length of the claw-receiving hole in the circumferential direction of the rotary shaft is larger than a length of the engagement claw in the circumferential direction of the rotary shaft.

According to a twelfth aspect of the disclosure, which is dependent on the eighth aspect, one of the first interlocker and the second interlocker is a protrusion extending along the axial direction of the rotary shaft and having a length in the circumferential direction of the rotary shaft equal to a first width, the other one of the first interlocker and the second interlocker is a groove extending along the axial direction of the rotary shaft and having a length in the circumferential direction of the rotary shaft equal to a second width, the second width being larger than the first width, and the urging member is a coil spring and urges the first sleeve and the second sleeve to cause the protrusion to abut on one of two sides of the groove.

According to a thirteenth aspect of the disclosure, an image forming apparatus includes the transmission mechanism according to the eighth aspect, wherein the transmission mechanism transmits rotational force to a fusing unit.

According to the disclosure, since the rotational force transmission device functions as a torque limiter mechanism and a buffer mechanism, gear breakage can be properly prevented when the detachable unit is locked, and gear breakage can be properly prevented when the detachable unit is installed. According to the disclosure, since the coil spring and the second sleeve are shared as components of the torque limiter mechanism and the buffer mechanism, it is possible to reduce parts, cost, and size. The transmission mechanism is unitized ley disposing the urging member between the first sleeve and the second sleeve. Thus, the transmission mechanism can be readily assembled into the body of the rotational force transmission device.

The above-described objects, other objects, features, and advantages of the present disclosure will become more apparent from the detailed description of the following embodiment given with reference to the drawings.

DESCRIPTION OF THE PREFERRED EMBODIMENTS

First Embodiment

Figure 1:
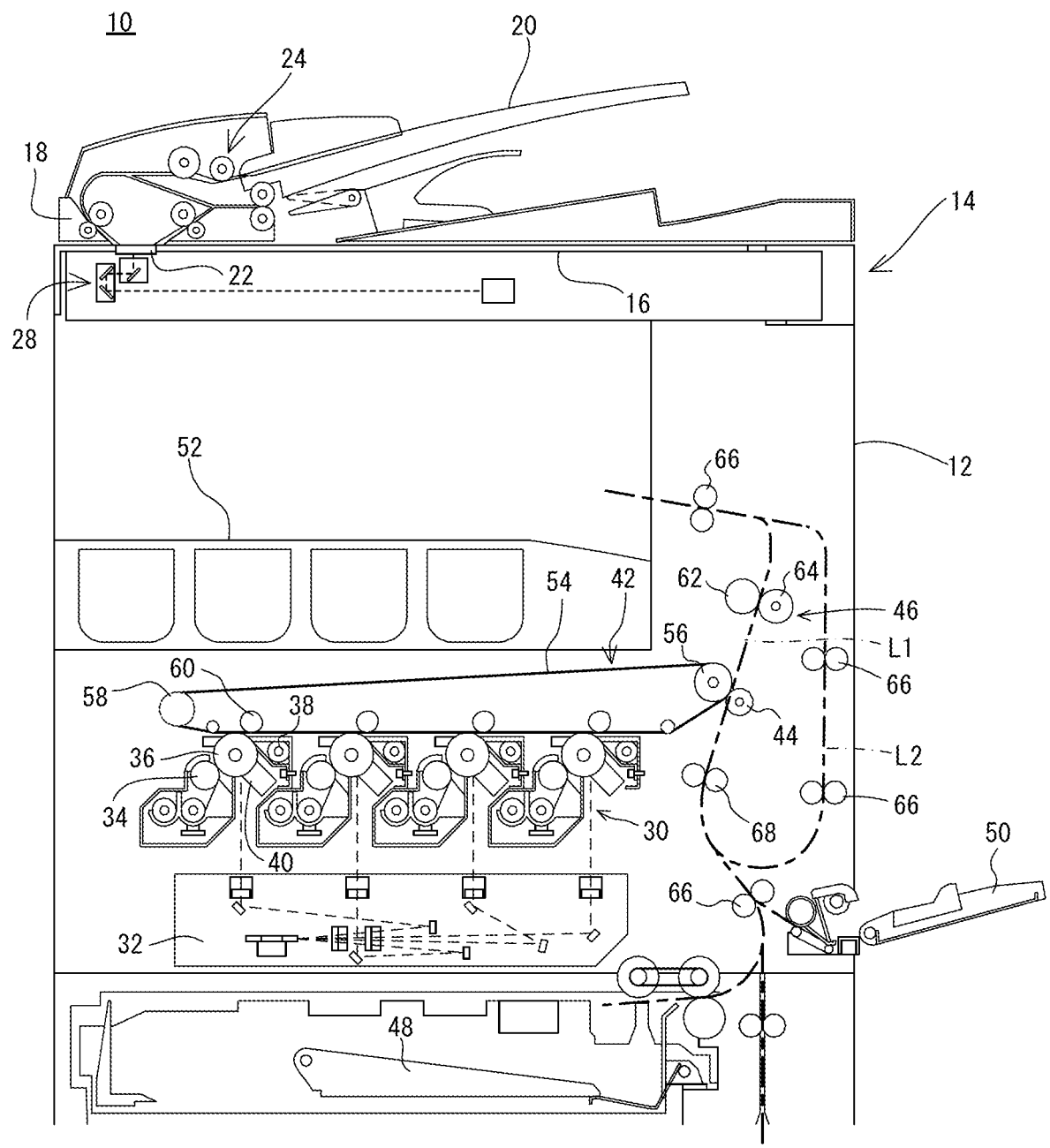
FIG. 1 is a schematic cross-sectional view of the internal structure of an image forming apparatus including a rotational force transmission device including a transmission mechanism, according to a first embodiment of the disclosure.
Figure 2:
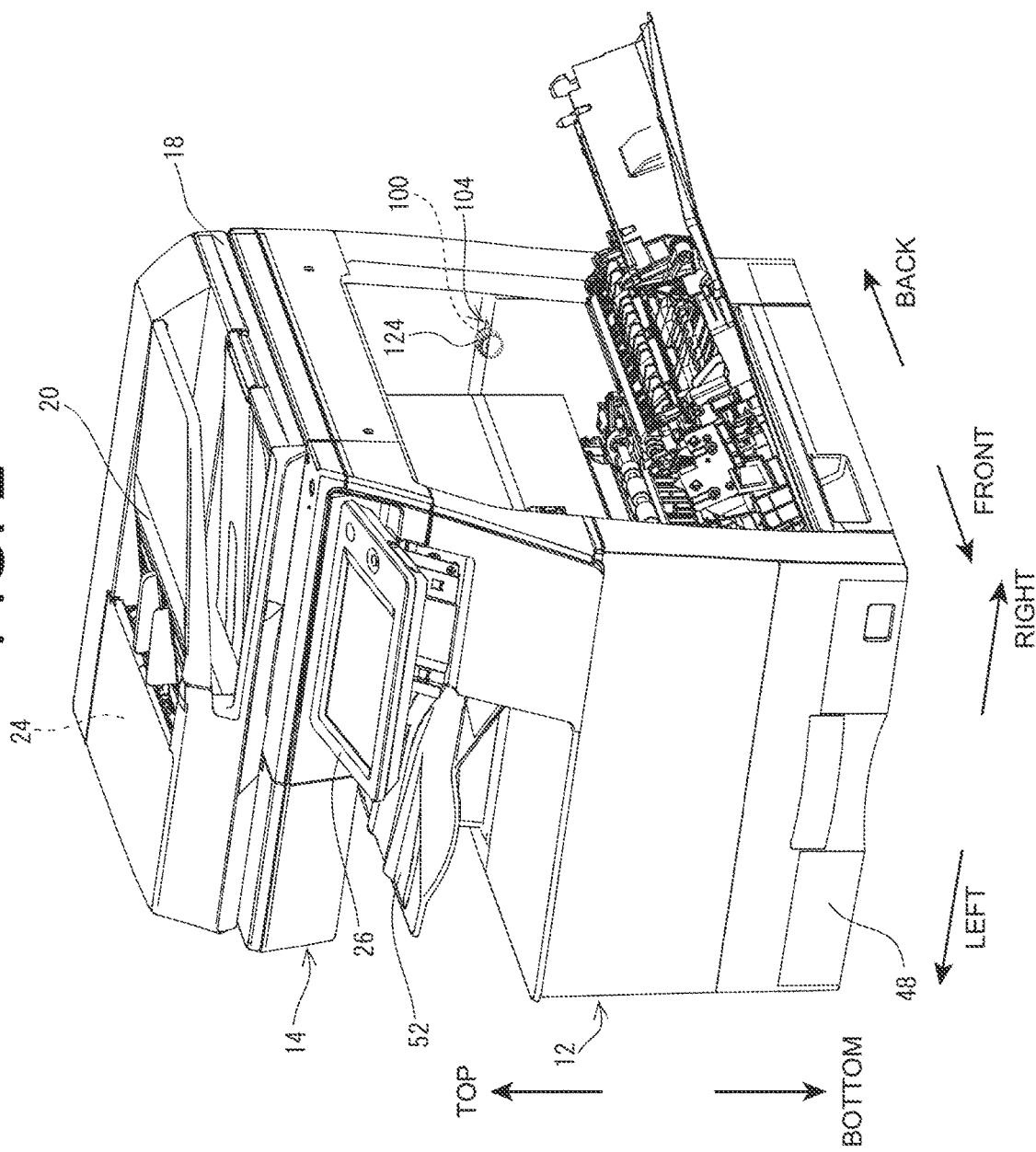
FIG. 2 is a perspective view of the image forming apparatus with the fusing unit removed.

Referring to FIGS. 1 and 2, an image forming apparatus 10, which is one embodiment of the disclosure, is an apparatus that forms a multicolored or monochromatic image on a sheet of paper (a recording medium) by an electrophotographic method. As described in detail below, the image forming apparatus 10 includes a rotational force transmission device 104 disposed in the apparatus body 12. The rotational force transmission device 104 includes an input gear 122, an output gear 124, and a transmission mechanism 126 (see FIG. 6), and transmits driving force (rotational force) from a motor 102 to a fusing unit 46, which is an example of a detachable unit.

The basic configuration of the image forming apparatus 10 will now be briefly described. Note that in this specification, the front-back direction (depth direction) of the image forming apparatus 10 and its components are defined such that the surface facing the user's standing position, that is, the surface on the side to which an operation unit 26 is disposed is the forward surface (front surface). The left-right direction (transverse directions) of the image forming apparatus 10 and its components are defined with reference to the state in which the image forming apparatus 10 is viewed from a user.

As illustrated in FIGS. 1 and 2, the image forming apparatus 10 according to the present embodiment is a multifunction peripheral (MFP) having a copier function, a printer function, a scanner function, a facsimile function, and the like. The image forming apparatus 10 includes an apparatus body 12 including an image former 30, etc., and an image reading device 14 disposed above the apparatus body 12.

The image reacting device 14 includes a document table 16 that is made of transparent material. A document pressing cover 18 is attached in a freely openable/closable manner on the upper portion of the document table 16 via a hinge or the like. The document pressing cover 18 is provided with an automatic document feeder (ADF) 24 that automatically feeds, one sheet at a time, documents placed on a document loading tray 20 to an image reacting position 22. On the front surface side of the document table 16, the operation unit 26 is provided to accept the user's input operation, such as a print instruction. The operation unit 26 is appropriately provided with a display such as a touch screen, various operation buttons, etc.

An image reader 28 that includes a light source, multiple mirrors, an imaging lens, a line sensor, and the like is installed in the image reading device 14. The image reader 28 exposes a document surface to the light source, and leads reflected light, which is reflected from the document surface, to the imaging lens by using the mirrors. Then, the reflected light is focused on a light receiving element of the line sensor by the imaging lens, for imaging. The line sensor detects the luminance and chromaticity of the reflected light focused on the light receiving element for imaging, and generates image data based on an image on the surface of the document. As the line sensor, a charge-coupled device (CCD) or a contact image sensor (CIS), etc., is used.

The apparatus body 12 incorporates a controller (not illustrated) including a CPU and memory, an image former 30, etc. In response to the input operation to the operation unit 26 by the user, the controller sends a control signal to each component in the image forming apparatus 10 and causes the image forming apparatus 10 to perform various types of operation.

The image former 30 includes an exposure unit 32, a developing device 34, the photoreceptor drum 36, a cleaner unit 38, a charger 40, an intermediate transfer belt unit 42, a secondary transfer roller 44, a fusing unit 46, and the like, forms an image on paper that is advanced from a sheet feed tray 48 or a manual sheet feed tray 50, and discharges the image-formed paper into an output tray 52. As the image data used to form the image on the paper, image data read by the image reader 28, image data sent from an external computer, or the like is used.

The image data handled by the image forming apparatus 10 correspond to a color image in four colors including black (K), cyan (C), magenta (M), and yellow (Y). Accordingly, four each of the developing devices 34, the photoreceptor drums 36, the cleaner units 38, and the chargers 40 are provided to form four types of latent images corresponding to the four colors, and these constitute four image stations.

The photoreceptor drum 36 is an image carrier in which a photosensitive layer is formed on a surface of a conductive cylindrical base body, and the charger 40 is a member that charges a surface of this photoreceptor drum 36 to a predetermined potential. The exposure unit 32, which is a laser scanning unit (LSU) that includes a laser emitter and a reflection mirror, forms an electrostatic latent image corresponding to the image data on the surface of the photoreceptor drum 36 by exposing the surface of the charged photoreceptor drum 36. The developing device 34 visualizes the electrostatic latent image, which is formed on the surface of the photoreceptor drum 36, by using toners in four colors (Y, M, C, and K). The cleaner unit 38 removes a residual toner remaining on the surface of the photoreceptor drum 36 after the development and the image transfer.

The intermediate transfer belt unit 42 includes an intermediate transfer belt 54, a drive roller 56, a driven roller 58, and four intermediate transfer rollers 60, and is disposed above the photoreceptor drum 36. The intermediate transfer belt 54 is a flexible endless belt that is stretched across multiple rollers such as the drive roller 56 and the driven roller 58, and is disposed such that its surface (outer circumferential surface) comes into contact with the surface of the photoreceptor drum 36. The intermediate transfer belt 54 rotates (rotationally moves) in a predetermined direction with a rotary drive of the drive roller 56. The intermediate transfer rollers 60 are arranged at positions in which the intermediate transfer rollers 60 face the photoreceptor drums 36 across the intermediate transfer belt 54, respectively. At the time of image formation, the toner images of the respective colors formed on the respective photoreceptor drums 36 are sequentially superimposed and transferred onto the intermediate transfer belt 54 by using the intermediate transfer rollers 60, to form a multi-color toner image on the intermediate transfer belt 54.

The secondary transfer roller 44 is disposed so as to face the drive roller 56 across the intermediate transfer belt 54. When the sheet passes through a secondary transfer nip between the secondary transfer roller 44 and the intermediate transfer belt 54, the toner image formed on the intermediate transfer belt 54 is transferred to the sheet.

The fusing unit 46 (fusing device) includes a fusing belt 62 and a pressure roller 64, and is disposed above the secondary transfer roller 44 (on the downstream side in the sheet conveyance direction). The fusing unit 46 is detachable from the apparatus body 12. A fusing pad 76 and a heat source 82 are disposed on the inner side of the fusing belt 62 (see FIG. 3). The fusing belt 62 is heated to a predetermined fusing temperature by the heat source 82. The pressure roller (34 presses the fusing belt 62 between the pressure roller 64 and the fusing pad 76. When the sheet passes through a fusing nip N between the pressure roller 64 and the fusing belt 62, the toner image transferred to the sheet is melted, mixed, and pressed, and the toner image thermally fuses to the sheet.

A fusing unit drive device 100 is fixed on the back side of the fusing unit 46 of the apparatus body 12 (right rear portion of the apparatus body 12). When the fusing unit 46 is installed on the apparatus body 12, the fusing unit 46 and the fusing unit drive device 100 are connected, and the pressure roller 64 is rotationally driven by receiving rotational driving force from the fusing unit drive device 100.

Specific configurations of the fusing unit 46 and the fusing unit drive device 100 will be described below.

In such an apparatus body 12, a first sheet conveyance path L1 is formed to advance the paper from the sheet feed tray 48 or the manual sheet feed tray 50 to the output tray 52 through a registration roller 68, the secondary transfer roller 44, and the fusing unit 46. A second sheet conveyance path L2 is also formed to return the sheet, which has passed through the fusing unit 46 after single-sided printing, to an upstream side of the secondary transfer roller 44 in a sheet conveyance direction in the first sheet conveyance path L1 when double-sided printing is performed on the sheet. Multiple conveyance rollers 66 are appropriately provided in the first sheet conveyance path L1 and the second sheet conveyance path L2 to apply auxiliary propulsion force to the sheet.

The configuration of the fusing unit 46 will now be described with reference to FIG. 3. The fusing unit 46 includes a fusing belt 62 and a pressure roller 64 as an example of a pressure rotary body, and fuses the toner image on the sheet by passing the sheet through the fusing nip N formed between the fusing bell 62 and the pressure roller 64.

Figure 3:
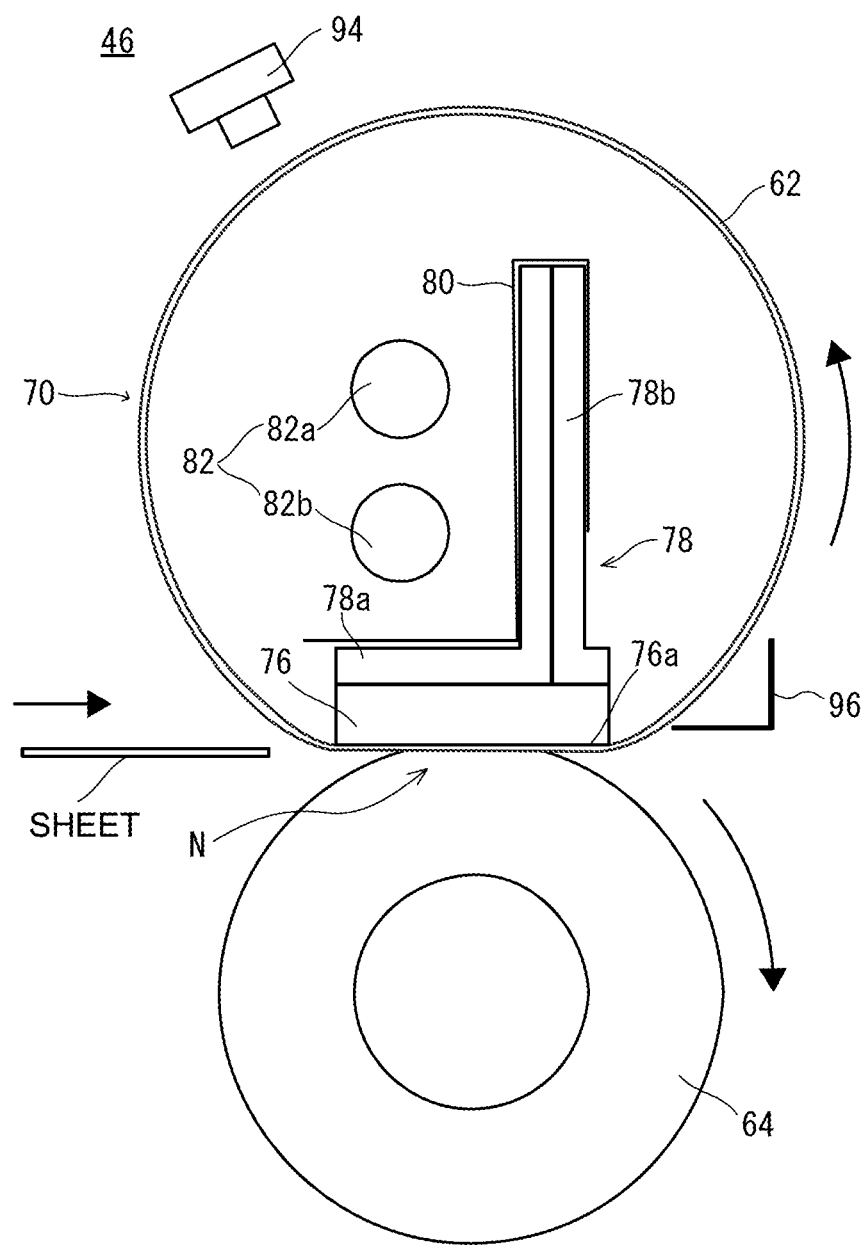
FIG. 3 is a schematic cross-sectional view of the fusing unit.

Specifically, the fusing unit 46 includes a heater unit 70 including the fusing belt 62, etc., and the pressure roller 64, as illustrated in FIG. 3. The components of the heater unit 70 and the pressure roller 64 are integrally held by a fusing frame (not illustrated) in a predetermined mode.

The heater unit 70 includes the fusing belt 62 formed in a substantially cylindrical shape and extending in the front-back direction (the width direction of the sheet). The fusing belt 62 is, for example, formed by disposing a release layer on the surface of a belt-like base material composed of a synthetic resin, such as polyimide, or a metal, such as nickel. Such a fusing belt 62 is rotatable around its axis, and its inner diameter is, for example, 30 mm. The fusing pad 76, a support member 78, a reflector 80, and the heat source 82 are disposed on the inner side of the fusing belt 62.

The fusing pad 76 is a fixed member fixed in sliding contact with the inner circumferential surface of the fusing belt 62, and is formed in a long plate shape extending along the axial direction of the fusing belt 62. The fusing pad 76 has a sliding contact sheet 76a on its outer circumferential surface (at least a sliding contact surface with the fusing belt 62), and sliding oil for reducing the frictional force with the fusing belt 62 is applied to the sliding contact sheet 76a. The length of the fusing pad 76 is the same as the length (width) of the fusing belt 62 in the axial direction.

The support member 78 supports the fusing pad 76 while pressing it against the inner circumferential surface of the fusing belt 62, and the two ends of the support member 78 are fixed to the fusing frame. In the present embodiment, the support member 78, which has a substantially L-shaped cross-section, includes a long plate-shaped fixing part 78a to which the fusing pad 76 is fixed, and a long plate-shaped erected part 78b that is erected from the width direction end of the fixing part 78a. The reflector 80 having a plate-like shape is attached to the support member 78 so as to cover the surface adjacent to the heat source 82.

The heat source 82 is a member for heating the fusing belt 62, and extends along the axial direction of the fusing belt 62. The heat source 82 is, for example, a lamp heater such as a halogen lamp. In the present embodiment, the heat source 82 includes a first lamp heater 82a that heats a central portion of the fusing belt 62 in the axial direction, and a second lamp heater 82b that heats the two ends of the fusing belt 62 in the axial direction.

The pressure roller 64 opposes the fusing pad 76 across the fusing belt 62. The pressure roller 64 is disposed so as to extend parallel to the axial direction of the fusing pad 62, and presses the fusing belt 62 against the fusing pad 76 to form the fusing nip N between the pressure roller 64 and the fusing belt 62.

A gear (not illustrated) is provided at the rear end of the roller shaft (not illustrated) of the pressure roller 64. The output gear 124 of the rotational force transmission device 104 described below is connected to this gear to connect the motor 102 (see FIG. 4) to the roller shaft of the pressure roller 64, and the pressure roller 64 is rotationally driven by the driving force from the motor 102. The fusing belt 62 is driven to rotate in a direction opposite to the rotation direction of the pressure roller 64 in conjunction with the rotational driving of the pressure roller 64. That is, the pressure roller 64 is brought into contact with the outer circumferential surface of the fusing belt 62 to form the fusing nip N with respect to the fusing belt 62, and the rotational driving force is transmitted to the fusing belt 62 via the fusing nip N. This causes the fusing belt 62 to be driven and rotated.

The fusing unit 46 includes a temperature sensor 94, such as a thermopile, that detects the surface temperature of the fusing belt 62. A release plate 96 is disposed downstream of the fusing nip N in the sheet conveyance direction and prevents the sheet from being wound around the fusing belt 62.

Figure 4:
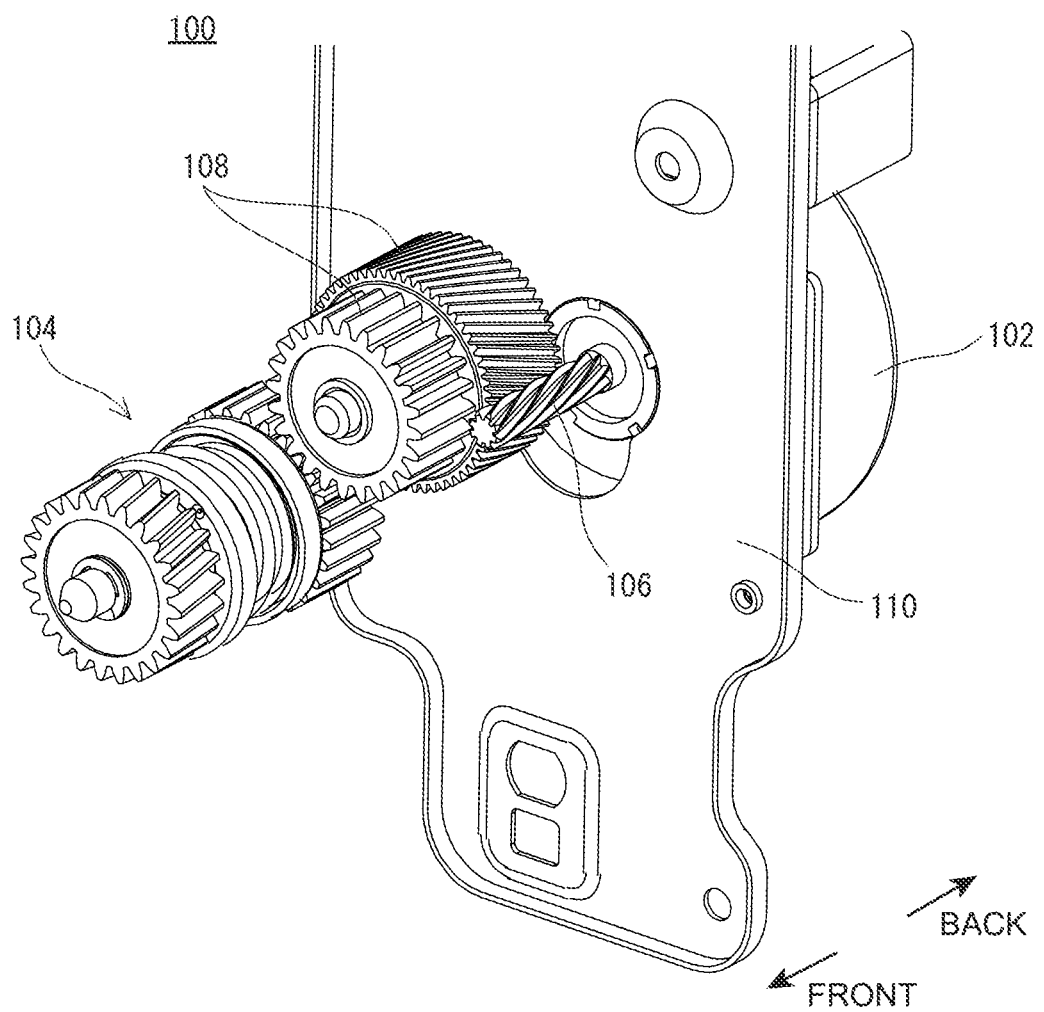
FIG. 4 is a cross-sectional view of a fusing unit drive device.

The configuration of the fusing unit drive device 100 will now be described. As illustrated in FIG. 4, the fusing unit drive device 100 is a device for providing rotational driving force to the fusing unit 46, and includes a motor 102, which is an example of a drive source, and the rotational force transmission device 104. The rotational force transmission device 104 is connected to the motor 102 via a pinion gear 106 and an intermediate gear 108. The motor 102, the rotational force transmission device 104, the pinion gear 106, the intermediate gear 108, etc., are held in a predetermined mode by a frame 110. The driving force from the motor 102 is transmitted to the pressure roller 64 of the fusing unit 46 through the pinion gear 106, the intermediate gear 108, and the rotational force transmission device 104.

Figure 5:
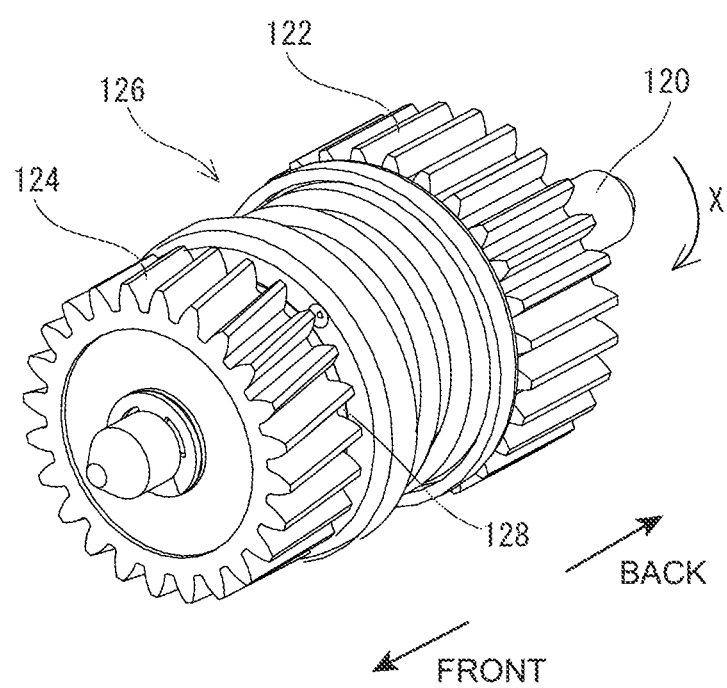
FIG. 5 is a perspective view of the rotational force transmission device.
Figure 6:
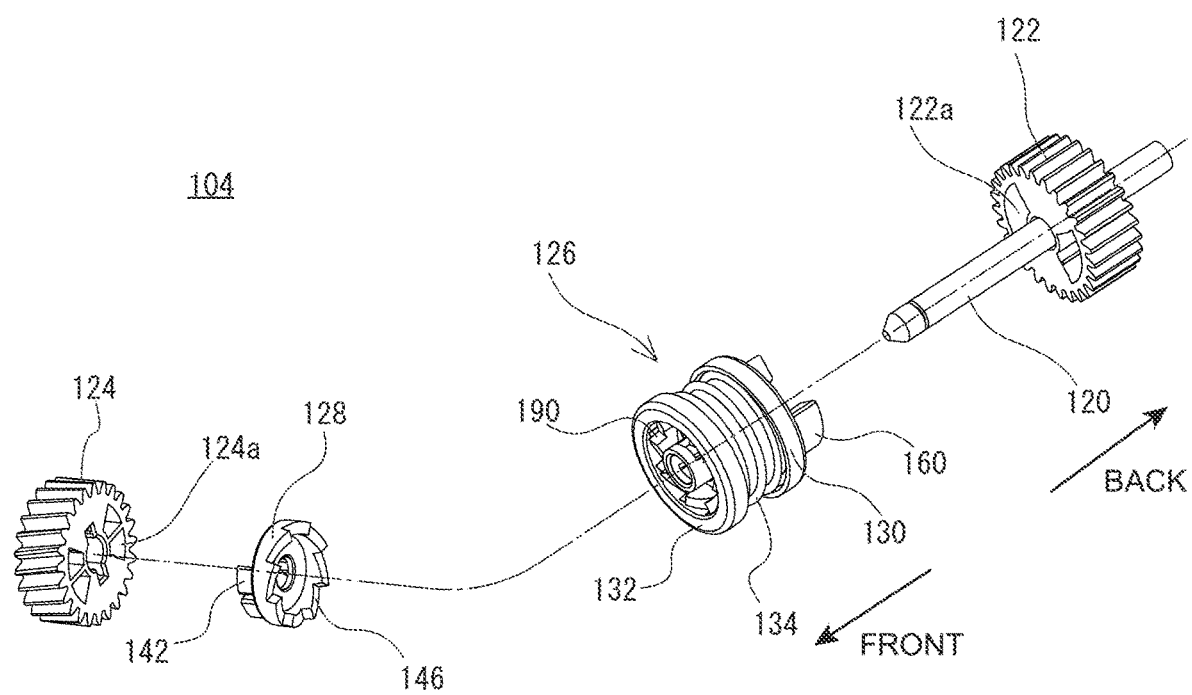
FIG. 6 is an exploded perspective diagram illustrating the configuration of the rotational force transmission device.

As illustrated in FIGS. 5 and 6, the rotational force transmission device 104 includes a synthetic resin input gear 122 (first gear) and a synthetic resin output gear 124 (second gear) disposed side by side on the same rotary shaft 120 (spindle). When the fusing unit 46 is installed on the apparatus body 12, the gear disposed at the rear end of the roller shaft of the pressure roller 64 is meshed with the output gear 124 of the rotational force transmission device 104. The rotational force transmission device 104 transmits the rotational force to the pressure roller 64 of the fusing unit 46 when the input gear 122 and the output gear 124 rotate in a first direction X (positive rotation direction) around the rotary shaft 120 by the driving force from the motor 102.

Here, it is preferable to provide a torque limiter mechanism in order to prevent gear breakage due to a high load on the fusing unit drive device 100 when the fusing unit 46 is locked due to breakage of the fusing belt 62. It is preferable to provide buffering mechanism that alleviates the impact in order to prevent gear breakage due to an impact of the engagement of the gear of the pressure roller 64 and the output gear 124 of the rotational force transmission device 104 when the fusing unit 46 is installed on the apparatus body 12.

Thus, in the present embodiment by adopting the following configuration for the rotational force transmission device 104, the rotational force transmission device 104 is made to function as a torque limiter mechanism and a buffer mechanism while saving components and reducing costs by sharing components. By unitizing the urging members with other parts, the ease of assembly to the apparatus body 12 is improved. The configuration of the rotational force transmission device 104 will now be described in detail.

As illustrated in FIGS. 5 and 6, a transmission mechanism 126 and a ratchet member 128 are disposed on the same rotary shaft 120 between the input gear 122 and the output gear 124. The transmission mechanism 126 is mounted on the front face (output gear 124 side) of the input gear 122. The transmission mechanism 126 is composed of three members: a first sleeve 130, a second sleeve 132, and a coil spring 134, which is an example of an urging member. These three members are combined with each other to form a unit. At the rear end of the transmission mechanism 126 (specifically, the rear end of the first sleeve 130), a fitting projection 160 is formed to be fitted into a fitting hole 122a formed in the input gear 122. The transmission mechanism 126 is connected and fixed to the input gear 122 by fitting the fitting hole 122a and the fitting projection 160, and rotates about the rotary shaft 120 together with the input gear 122. The front end of the transmission mechanism 126 (the end adjacent to the input gear 122, specifically the front end of the second sleeve 132) has a first ratchet 190.

Figure 7:
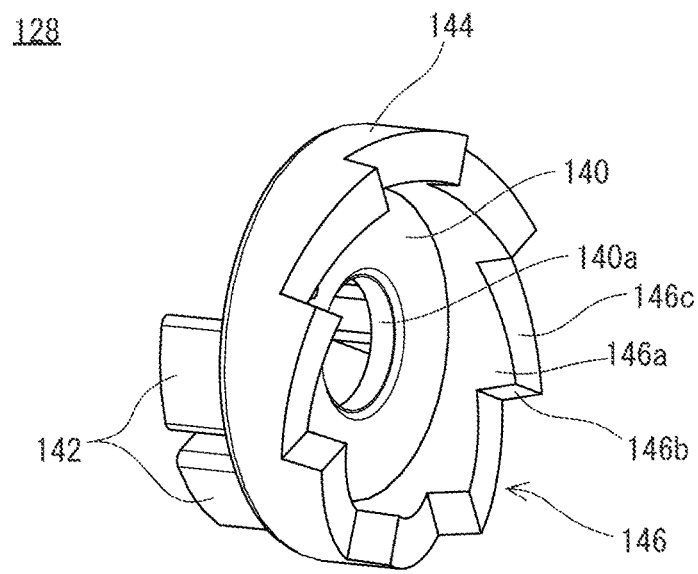
FIG. 7 is a perspective vie of a ratchet member of the rotational force transmission device.
Figure 8:
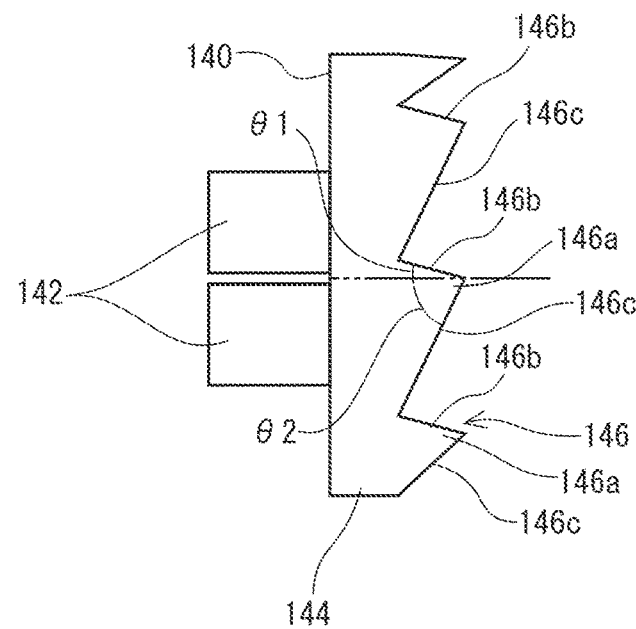
FIG. 8 is a front view of the ratchet member.

Referring to FIGS. 7 and 8, together with FIG. 6, the ratchet member 128 is made of synthetic resin and is mounted on the rear face of the output gear 124 (the side adjacent to the input gear 122). The ratchet member 128 includes an annular base 140 having at the center an insertion hole 140a through which the rotary shaft 120 is passed. On the front face of the base 140, four fitting projections 142 having a substantially trapezoidal cross-section are formed to be fitted into fitting holes 124 formed in the output gear 124. The ratchet member 128 is connected and fixed to the output gear 124 by fitting the fitting holes 124a and the fitting projections 142, and rotates about the rotary shaft 120 together with the output gear 124. A short cylinder 144 is formed on the rear face of the base 140 and projects rearward from the periphery thereof, and a second ratchet 146 engaging with the first ratchet 190 is formed on the rear end surface of the short cylinder 144 (that is, the end of the ratchet member 128 adjacent to the input gear 122).

The second ratchet 146 is composed of teeth 146a in the shape of saw teeth arranged in the circumferential direction. Each of the teeth 146a has a third tilt face 146b and a fourth tilt face 146c that respectively engage with a first tilt face 190b and a second tilt face 190c of the first ratchet 190, as described below. That is, the second ratchet 146 of the present embodiment has multiple third tilt faces 146b that tilt by a first tilt angle θ1 to the axial direction of the rotary shaft 120 and engaged with the respective first tilt faces 190b, and multiple fourth tilt faces 146c that tilt by a second tilt angle θ2 to the axial direction of the rotary shaft 120 and engaged with the respective second tilt faces 190c.

Figure 9:
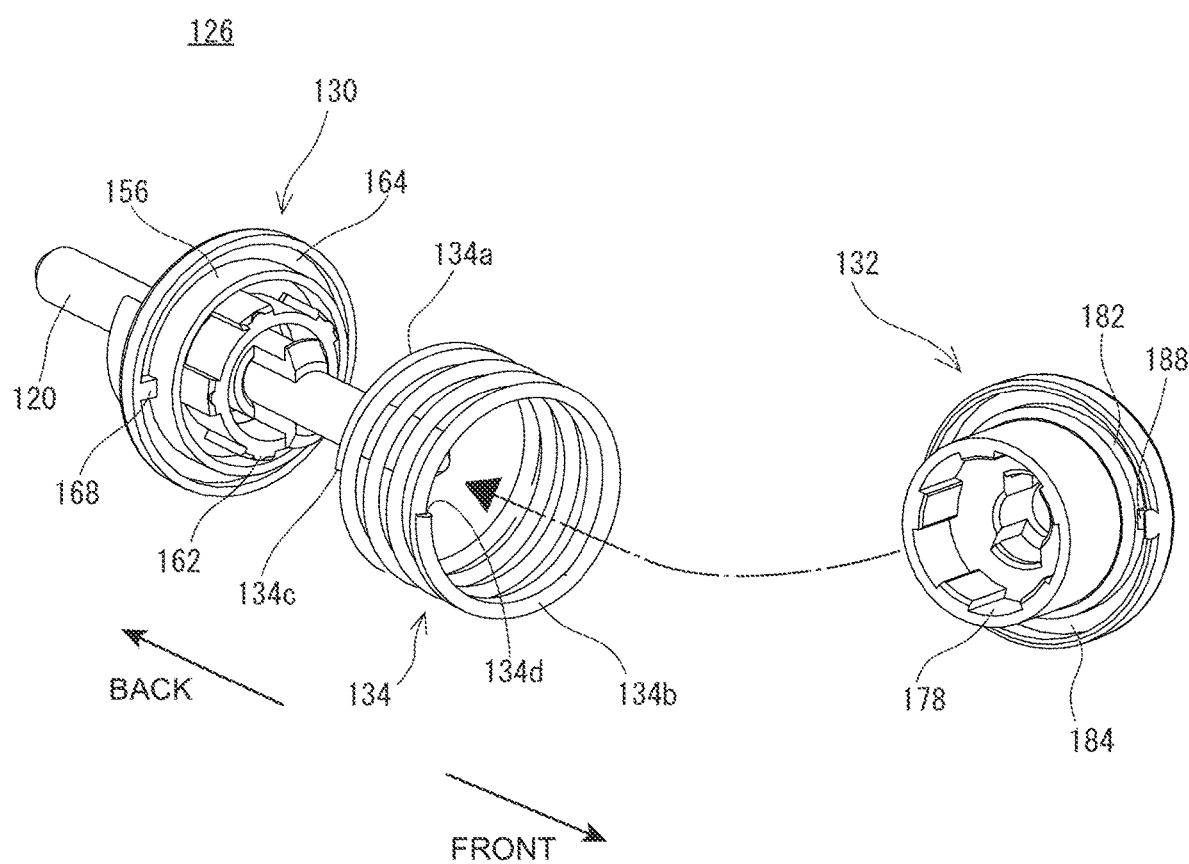
FIG. 9 is an exploded perspective diagram illustrating the configuration of the transmission mechanism of the rotational force transmission device.
Figure 10:
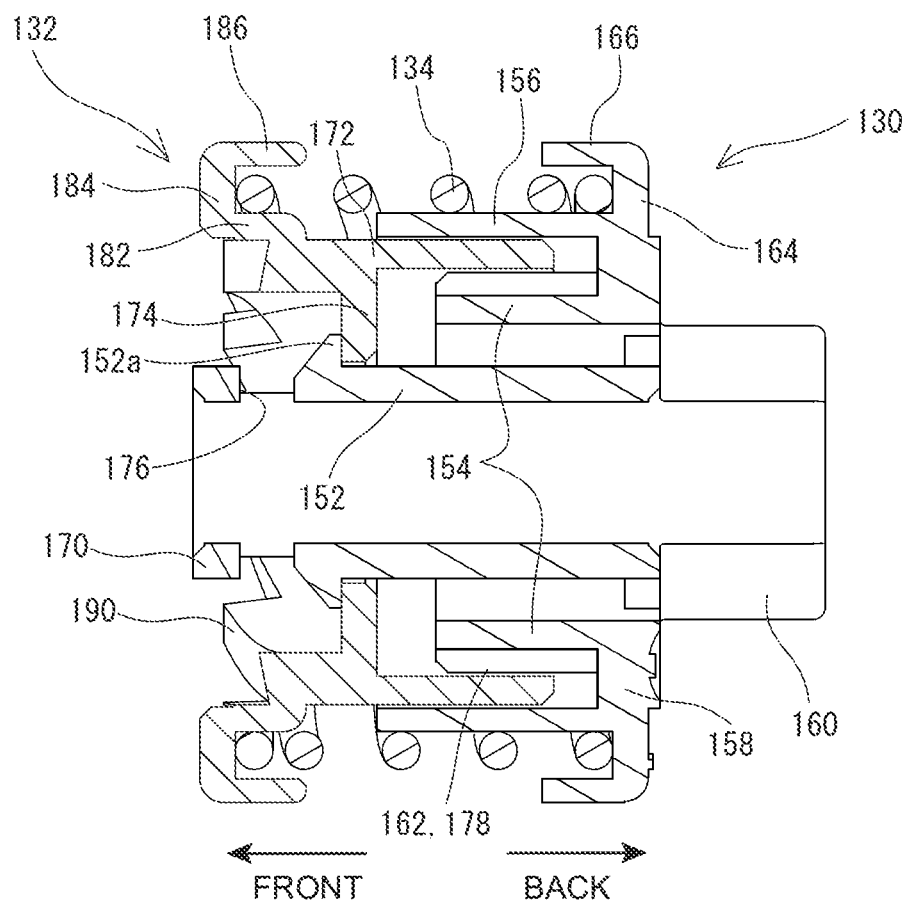
FIG. 10 is a cross-sectional view of the transmission mechanism.

As illustrated in FIGS. 9 and 10, the transmission mechanism 126 consists of three members: a first sleeve 130 disposed adjacent to the input gear 122, a second sleeve 132 disposed adjacent to the output gear 124, and a coil spring 134 disposed between the first sleeve 130 and the second sleeve 132. These three members are unitized prior to installation in the apparatus body 12. By forming a unit by disposing the coil spring 134 between the first sleeve 130 and the second sleeve 132, the transmission mechanism 126 can be readily installed in (assembled to) the apparatus body 12.

Figure 11:
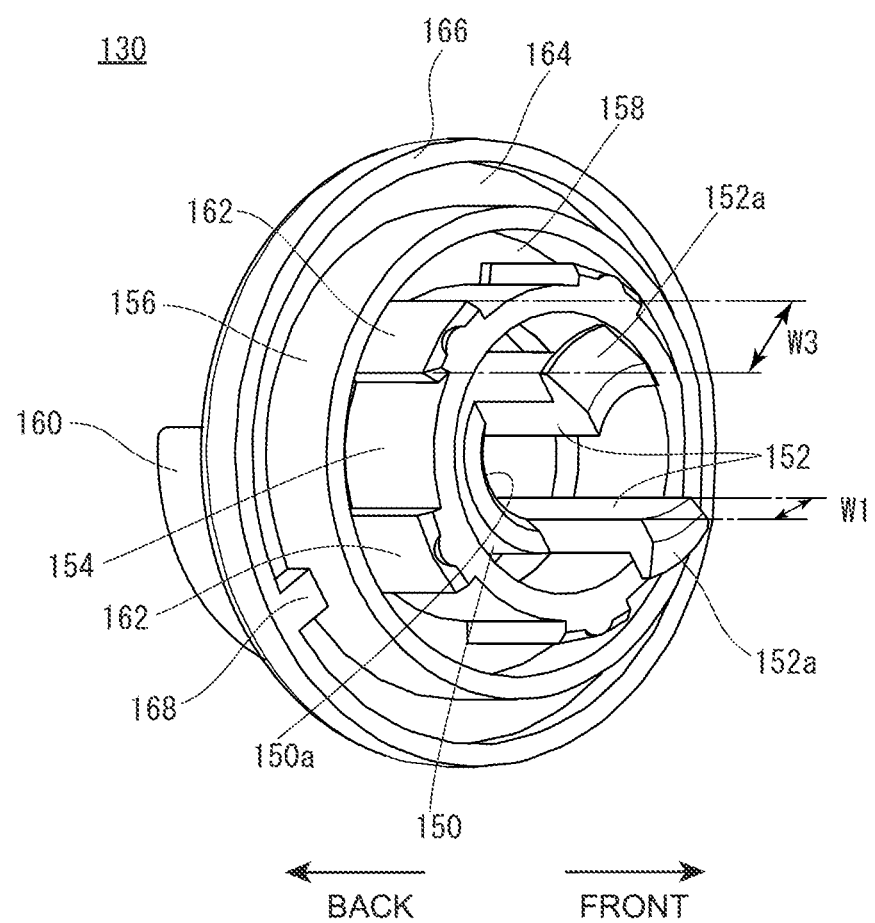
FIG. 11 is a perspective view of a first sleeve of the transmission mechanism.

Referring to FIG. 11 together with FIGS. 9 and 10, the first sleeve 130 is composed of synthetic resin and has a short cylindrical base 150 provided with an insertion hole 150a through which the rotary shaft 120 passes in the center. At the front end of the base 150, two engagement claws 152, which are an example of a first retainer, are formed. Each of the engagement claws 152 protrudes forward from the front end of the base 150 and extends in the axial direction of the rotary shaft 120. The tip of the engagement claw 152 is provided with a catch 152a protruding outward. The first sleeve 130 has a tubular cylinder 154 surrounding the base 150 and a tubular first holder 156 surrounding the cylinder 154. The base 150, the cylinder 154, and the first holder 156 are connected at their rear ends by an annular plate-like connector 158. On the rear face of the connector 158, two fitting projections 160 having a substantially trapezoidal cross-section are formed to be fitted into fitting holes 122a formed in the input gear 122.

A first interlocker 162 is formed on the outer circumferential surface of the cylinder 154. In the present embodiment, the first interlocker 162 has multiple substantially rectangular plate-like protrusions that are arranged at predetermined intervals in the circumferential direction of the rotary shaft 120 and extend in the axial direction of the rotary shaft 120. A flange-shaped first catch 164 projecting farther outward than the first holder 156 is formed on the periphery of the connector 158, and a short cylindrical fold 166 projecting forward is formed on the periphery of the first catch 164. A first restrictor 168 having a rectangular cross-section and protruding forward is formed on the front face of the first catch 164.

Figure 12:
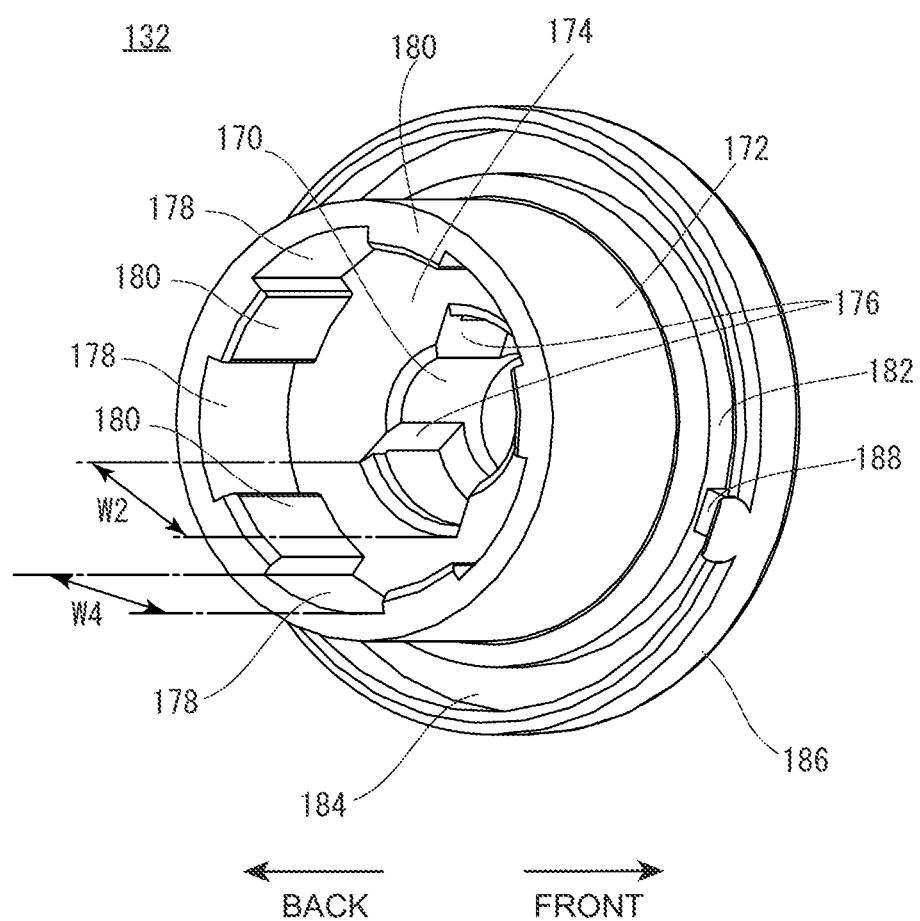
FIG. 12 is a first perspective view of a second sleeve of the transmission mechanism.
Figure 13:
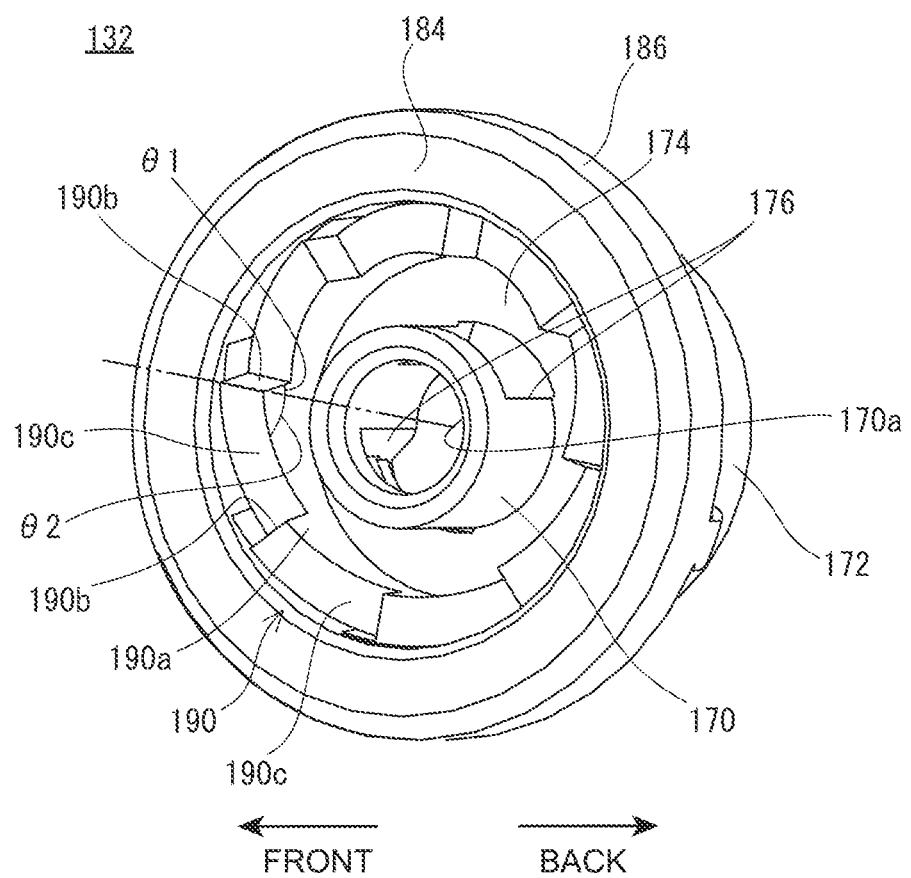
FIG. 13 is a second perspective view of the second sleeve.

Referring to FIGS. 12 and 13 together with FIGS. 9 and 10, the second sleeve 132 is composed of synthetic resin and has a short cylindrical base 170 provided with an insertion hole 170a through which the rotary shaft 120 passes in the center. The second sleeve 132 includes a tubular cylinder 172 surrounding the base 170, and the rear end of the base 170 and the center of the cylinder 172 are connected by an annular plate-shaped connector 174.

The base 170 and the connector 174 are each provided with two claw-receiving holes 176, which are each an example of a second retainer that engages with the first retainer (the engagement claw 152) of the first sleeve 130 in the axial direction of the rotary shaft 120. The claw-receiving holes 176 are holes each having a rectangular cross-section formed by cutting the rear portion of the base 170 and the inner periphery of the connector 158 in the thickness direction of the base 170. In the present embodiment, the length W2 of the claw-receiving hole 176 in the circumferential direction of the rotary shaft 120 is larger than the length W1 of the engagement claw 152 in the circumferential direction of the rotary shaft 120. That is a rotation clearance equal to the difference between W1 and W2 is provided between the engagement claw 152 and the claw-receiving hole 176 to allow movement in the circumferential direction of the rotary shaft 120. That is, the engagement claw 152 is attached to the claw-receiving hole 176 with a rotation clearance equal to the difference between W1 and W2, i.e., a clearance that allows movement in the circumferential direction of the rotary shaft 120.

By fitting the engagement claw 152 into the claw-receiving hole 176 and locking the catch 152a of the engagement claw 152 to the inner periphery of the connector 174, the second sleeve 132 is integrated (unitized) with the first sleeve 130 so as to be retained by in the first sleeve 130 in the axial direction (front) of the rotary shaft 120. By making the length of the claw-receiving hole 176 in the axial direction of the rotary shaft 120 is larger than the length of the catch 152a of the engagement claw 152, the second sleeve 132 is integrated with the first sleeve 130 so as to be movable in the axial direction of the rotary shaft 120.

A second interlocker 178 to be engaged with the first interlocker 162 of the first sleeve 130 is formed on the inner circumferential surface at the rear of the cylinder 172. In the present embodiment, the second interlocker 178 has multiple grooves that are arranged at predetermined intervals in the circumferential direction of the rotary shaft 120 and extend in the axial direction of the rotary shaft 120. Each of the grooves is formed by two projections 180. The engagement of the first interlocker 162 with the second interlocker 178 causes the rotational force of the first sleeve 130 to be transmitted to the second sleeve 132.

In the present embodiment, the length W4 (second width) of the second interlocker 178 in the circumferential direction of the rotary shaft 120 is larger than the length W3 (first width) of the first interlocker 162 in the circumferential direction of the rotary shaft 120. That is, the first interlocker 162 and the second interlocker 178 are engaged with a rotation clearance equal to the difference between W3 and W4 to allow movement in the circumferential direction of the rotary shaft 120. This rotation clearance a (see FIG. 16) is equivalent to at least one pitch and no more than three pitches in terms of the pitch of the output gear 124. That is, the second interlocker 178 engages with the first interlocker 162 with a rotation clearance that allows the second interlocker 178 to move by a predetermined distance in the circumferential direction of the rotary shaft 120. The clearance between the engagement claw 152 and the claw-receiving hole 176 in the circumferential direction is equal to or slightly larger than α. Thus, it can be said that the rotation clearance α is defined by the difference between the lengths of the first interlocker 162 and the second interlocker 178 in the circumferential direction.

A short cylindrical second holder 182 is disposed on the outer circumferential surface of the front end of the cylinder 172. A flange-shaped second catch 184 is formed on the front end of the second holder 182, and a short cylindrical fold 186 projecting rearward is formed on the periphery of the second catch 184. A second restrictor 188 having a rectangular cross-section and protruding rearward is formed on the rear face of the second catch 184.

The first ratchet 190 is then formed at the front end of the cylinder 172. The first ratchet 190 is composed of teeth 190a in the shape of saw teeth arranged in the circumferential direction. Each of the teeth 190a has a first tilt face 190b formed on the face of the side pushing the second ratchet 146 when the transmission mechanism 126 rotates in the first direction X to transmit the driving force from the motor 102 to the ratchet member 128, and a second tilt face 190c formed on the opposite side. The second tilt angle θ2 of the second tilt face 190c relative to the axial direction of the rotary shaft 120 larger than the first tilt angle θ1 of the first tilt face 190b. That is, the first ratchet 190 of the present embodiment has multiple first tilt faces 190b that tilt by the first tilt angle θ1 to the axial direction of the rotary shaft 120, and multiple second tilt faces 190c that are disposed between the first tilt faces 190b and tilt by the second tilt angle θ2, which is larger than the first tilt angle θ1, to the axial direction of the rotary shaft 120. It is preferred that the first tilt angle θ1 be, for example, within the range of 2 to 15 degrees, both inclusive, and the second tilt angle θ2 be, for example, within the range of 60 and 80 degrees, both inclusive.

Returning to FIGS. 9 and 10, the coil spring 134, which is an example of an urging member, is a general-purpose compression coil spring in which a metal wire is spirally wound at a predetermined pitch in the axial direction and is disposed to be sandwiched between the first sleeve 130 and the second sleeve 132. Specifically, the rear end of the coil spring 134 is held by the first holder 156 of the first sleeve 130 by being externally fitted to the first holder 156, and the front end of the coil spring 134 is held by the second holder 182 of the second sleeve 132 by being externally fitted to the second holder 182. At this time, the rear end 134a of the coil spring 134 abuts on the first catch 164 of the first sleeve 130, and the front end 134b of the coil spring 134 abuts on the second catch 184 of the second sleeve 132. The first sleeve 130 and the second sleeve 132 are then urged away from each other in the axial direction of the rotary shaft 120 by the restoring force against compression of the coil spring 134. That is, the coil spring 134 urges the second sleeve 132 toward the ratchet member 128.

The coil spring 134 is slightly twisted in the radial direction when it is attached to the first sleeve 130 and the second sleeve 132. In this state, one end 134c (one end face) of the wire rod forming the coil spring 134 and the first restrictor 168 of the first sleeve 130 abut on each other in the circumferential direction of the rotary shaft 120, to restrict the circumferential position of the one end 134c. The other end 134d (the other end face) of the wire rod forming the coil spring 134 and the second restrictor 188 of the second sleeve 132 abut on each other in the circumferential direction of the rotary shaft 120, to restrict the circumferential position of the other end 134d. This causes the coil spring 134 to urge the first sleeve 130 and the second sleeve 132 in the direction in which the first interlocker 162 and the second interlocker 178 disengage by the restoring force against torsion, that is, in the direction in which the first interlocker 162 (protrusion) abuts on one side face 178a of the two side faces of the second interlocker 178 (groove) (see FIG. 16). The side face 178a is the side face remote from the side face 178b abutting on the first interlocker 162 when the first sleeve 130 rotates in the first direction X. Thus, it can also be said that the coil spring 134 urges the first sleeve 130 and the second sleeve 132 so that the rotation clearance with the second interlocker is provided farther than the first interlocker 162 in the first direction X by the restoring force against torsion.

Figure 14:
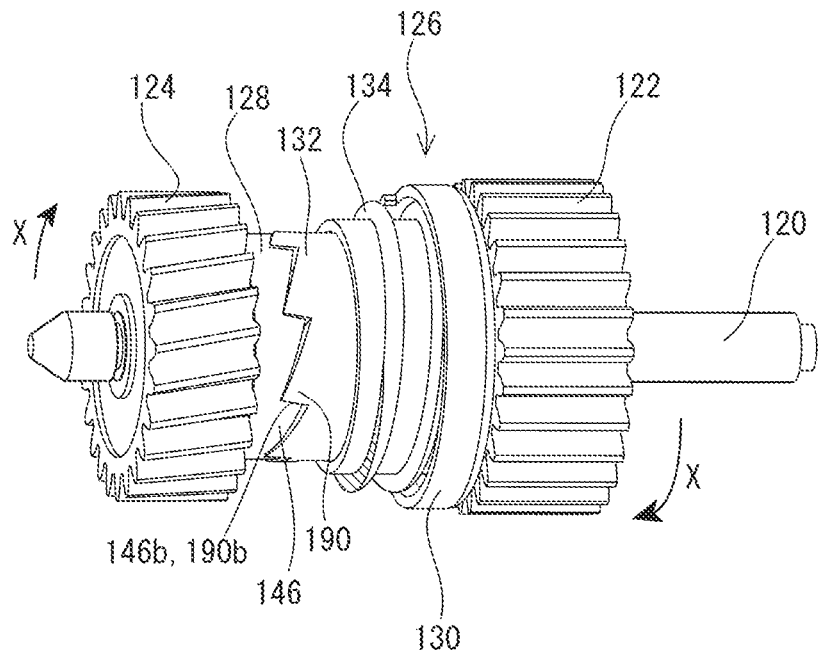
FIG. 14 is an illustration of the internal structure of the rotational force transmission device with a first ratchet and a second ratchet engaged.

As illustrated in FIG. 14, when the rotational force transmission device 104 described above drives the fusing unit 46, the input gear 122 receives the driving force from the motor 102, thereby rotating the input gear 122 in the first direction X. With this, the transmission mechanism 126 rotates in the first direction X, and the first tilt face 190b of the first ratchet 190 pushes the third tilt face 146b of the second ratchet 146, to rotate the ratchet member 128 and the output gear 124 in the first direction X. This causes the driving force of the motor 102 to be transmitted to the pressure roller 64 of the fusing unit 46, and the pressure roller 64 rotates in the forward rotation direction (the conveying direction of a sheet toward the output tray 52).

Figure 15:
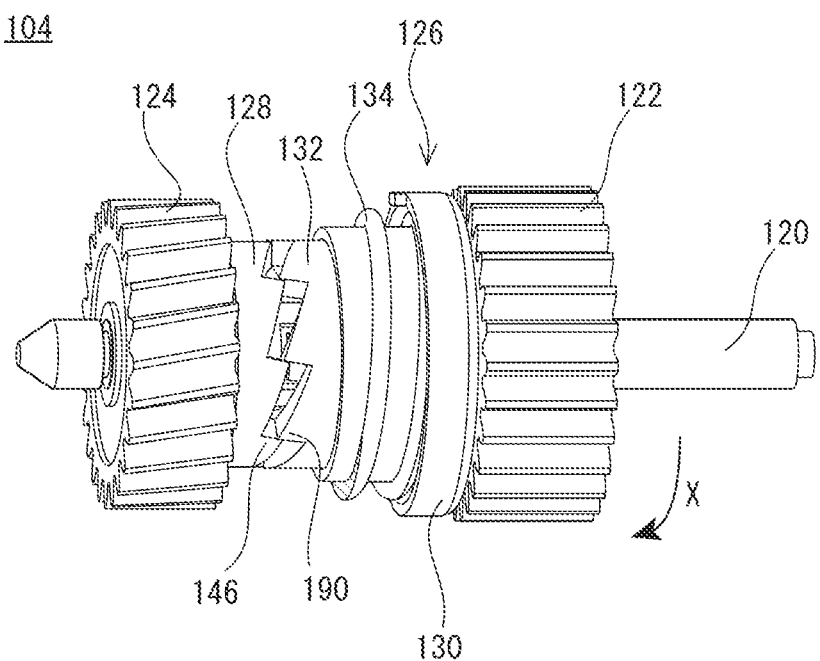
FIG. 15 is an illustration of the internal structure of the rotational force transmission device with a first ratchet and a second ratchet disengaged.

As illustrated in FIG. 15, when the fusing unit 46 is locked while the motor 102 is driven and a rotational load equal to or greater than a predetermined value is applied between the first ratchet 190 and the second ratchet 146, the first ratchet 190 and the second ratchet 146 disengage as a result of the second sleeve 132 moving away from the ratchet member 128 (rearward) against the urging force of the coil spring 134. The second sleeve 132 moves away from the ratchet member 128 when a rotational load equal to or greater than a predetermined value is applied between the first ratchet 190 and the second ratchet 146 because the first ratchet 190 and the second ratchet 146 have the first tilt faces 190b and the third tilt faces 146b. That is, in the present embodiment, the torque limiter mechanism is composed of three parts: the ratchet member 128, the second sleeve 132, and the coil spring 134.

Figure 16:
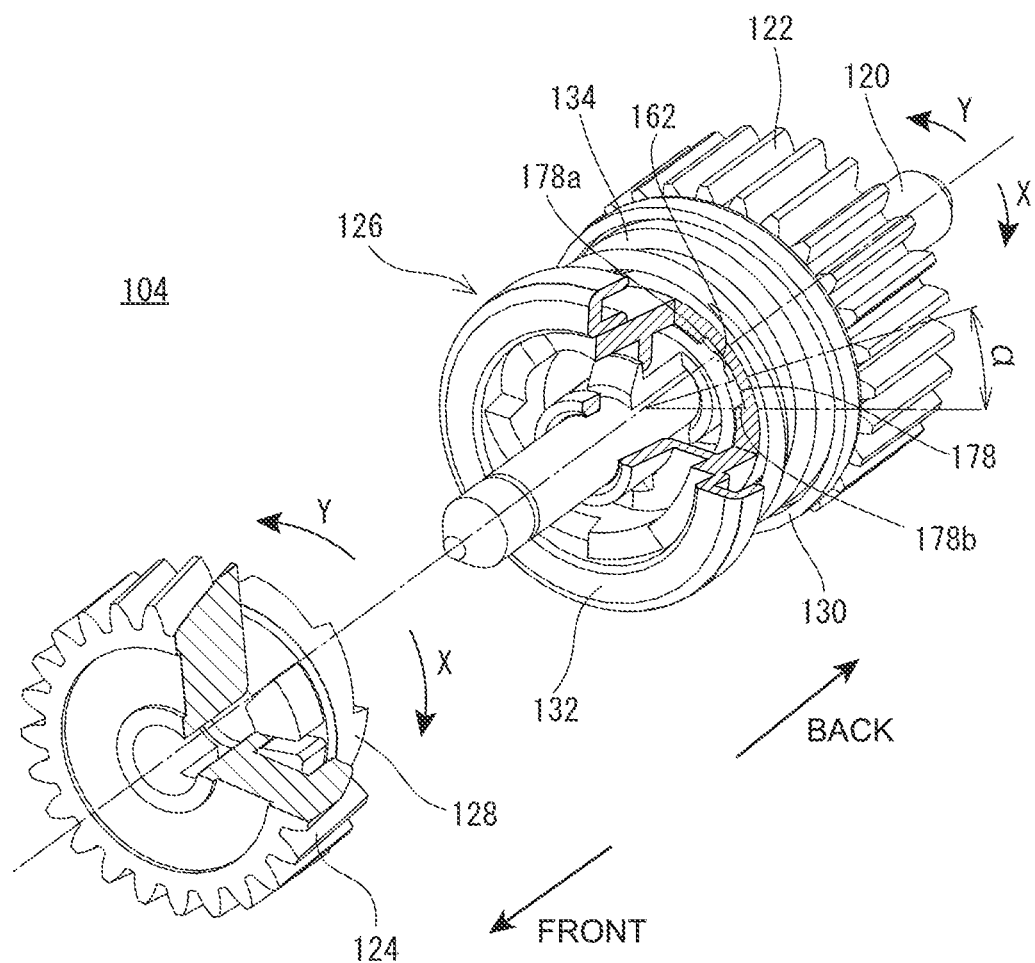
FIG. 16 is an illustration of the buffering operation of the rotational force transmission device.

In the present embodiment, as illustrated in FIG. 16, the first interlocker 162 and the second interlocker 178 are engaged with a rotation clearance in the circumferential direction of the rotary shaft 120, and the first sleeve 130 and the second sleeve 132 are urged by the coil spring 134 in the direction of the disengagement of the first interlocker 162 and the second interlocker 178, to cause the first interlocker 162 abuts on one side face 178a of the second interlocker 178. This forms a non-transmission section in which no rotational force is transmitted by a circumferential distance equal to the rotation clearance α in a free state in which the motor 102 is stopped, and enables the second sleeve 132 to idle in the second direction Y relative to the first sleeve 130. Thus, when the fusing unit 46 is installed on the apparatus body 12, that is, when the gear of the pressure roller 64 is engaged with the output gear 124 of the rotational force transmission device 104 in a free state in which the motor 102 is stopped, the second sleeve 132, the ratchet member 128, and the output gear 124 can idle relative to the first sleeve 130, so that the impact during this engagement can be mitigated. That is, in the present embodiment, the buffer mechanism is composed of three parts: the first sleeve 130, the second sleeve 132, and the coil spring 134. In other words, the buffer mechanism is composed of three parts: the first sleeve 130, the second sleeve 132, and the coil spring 134, which constitute the transmission mechanism 126. Even if the fusing unit 46 is locked (the pressure roller 64 does not rotate) for some reason, the fusing unit 46 can be readily removed from the apparatus body 12 because of the rotation clearance.

As described above, according to the present embodiment, since the rotational force transmission device 104 functions as a torque limiter mechanism and a buffer mechanism, gear breakage can be properly prevented when the fusing unit 46 is locked, and gear breakage can be properly prevented when the fusing unit 46 is installed.

According to the present embodiment, since the coil spring 134 is disposed between the first sleeve 130 and the second sleeve 132 and unitized, the transmission mechanism 126 can be readily assembled on to the apparatus body 12. In other words, it excels in assembly performance. Since the transmission mechanism 126 also functions as a buffer mechanism, gear damage can be appropriately prevented when the fusing unit 46 is installed.

According to the present embodiment, the coil spring 134 functions as a compression spring in the torque limiter mechanism (and ratchet mechanism) and as a torsion spring in the buffer mechanism, that is, one coil spring 134 is shared by both mechanisms. The second sleeve 132 is shared by the torque limiter mechanism and the buffer mechanism. Therefore, it is possible to reduce parts, cost, and size.

Second Embodiment

Rotational force transmission device 104 according to the second embodiment of the disclosure will now be described with reference to FIG. 17. In the second embodiment, the configuration of the coil spring 134 of the transmission mechanism 126 of the rotational force transmission device 104 differs from that of the first embodiment. Since the other components are the same, the components that are common to those according to the above-described first embodiment are denoted by same reference numbers, and redundant descriptions are omitted or simplified.

Figure 17:
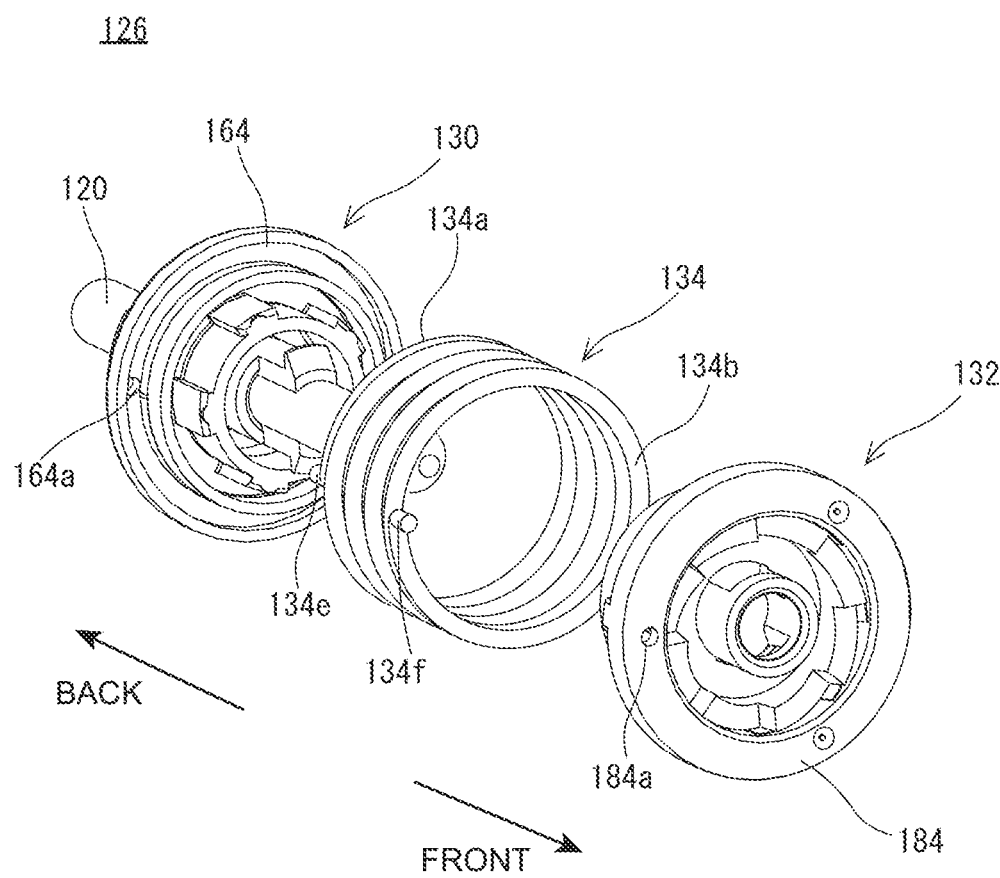
FIG. 17 is an exploded perspective diagram illustrating the configuration of the transmission mechanism of the rotational force transmission device according to a second embodiment of the disclosure.

As illustrated in FIG. 17, in the present embodiment, the two ends of the wire rod constituting the coil spring 134 have a first stretched section 134e and a second stretched section 134f that are stretched in the axial direction. The first catch 164 of the first sleeve 130 has an axially extending fitting hole 164a (another example of the first restrictor) having a circular cross-section, and the second catch 184 of the second sleeve 132 has an axially extending fitting hole 184a (another example of the second restrictor) having a circular cross-section. The circumferential position of the first stretched section 134e is restricted as a result of fitting and locking the first stretched section 134e into the fitting hole 164a. The circumferential position of the second stretched section 134f is restricted as a result of fitting and locking the second stretched section 134f into the fitting hole 184a.

The second embodiment achieves the same effect as that of the first embodiment described above, and gear damage can be appropriately prevented when the fusing unit 46 is installed.

In the above-described embodiment, the output gear and the second ratchet member are formed as separate parts, and the second ratchet member is attached to the output gear. However, the output gear and the second ratchet member may be molded into a single unit (one-piece molding) in advance. Similarly, the input gear and the first sleeve can be molded into a single unit in advance.

In the above-described embodiment, the first interlocker formed on the first sleeve is a protrusion, and the second interlocker formed on the second sleeve is a groove. Alternatively, the first interlocker may be a groove, and the second interlocker may be a protrusion. The first retainer formed on the first sleeve is an engagement claw, and the second retainer formed on the second sleeve is a claw-receiving hole. Alternatively, the first retainer may be the claw-receiving hole, and the second retainer may be an engagement claw.

In the above-described embodiment, a multifunction peripheral combining a copier, a facsimile machine, a printer, etc., exemplifies an image forming apparatus. Alternatively, the image forming apparatus may be a multifunction peripheral any one of the copier, the facsimile machine, the printer, etc., or a combination of at least two of the copier, the facsimile machine, the printer, etc. The image forming apparatus may be a monochrome machine.

In each of the above-described embodiments, the rotational force transmission device is applied to a fusing unit drive device. Alternatively, the rotational force transmission device may be applied to other rotational force transmission parts of the image forming apparatus as well as to rotational force transmission parts included in any type of device other than the image forming apparatus.

The specific numerical values, materials, and the like described above are mere examples, and can appropriately be changed according to need such as a product specification.

What is claimed is:

1. A rotational force transmission device comprising:
    a first gear and a second gear disposed side by side on a same rotary shaft, the first gear and the second gear rotating about the rotary shaft in a first direction by a driving force from a drive source to transmit a rotational force to a detachable unit;
    a transmission mechanism disposed on a side of the first gear adjacent to the second gear to rotate together with the first gear, the transmission mechanism comprising a first ratchet disposed at an end adjacent to the second gear; and
    a ratchet member disposed on a side of the second gear adjacent to the first gear to rotate together with the second gear, the ratchet member comprising a second ratchet at an end adjacent to the first gear, the second ratchet engaging with the first ratchet, wherein,
    the transmission mechanism comprises:
        a first sleeve disposed adjacent to the first gear and comprising a first interlocker;
        a second sleeve disposed adjacent to the second gear in a manner movable in an axial direction of the rotary shaft, the second sleeve comprising the first ratchet and a second interlocker, the second interlocker engaging with the first interlocker with a rotation clearance allowing movement in a circumferential direction of the rotary shaft by a predetermined distance; and
        a coil spring disposed between the first sleeve and the second sleeve, the coil spring urging the second sleeve toward the ratchet member by restoring a force against compression, the coil spring further urging the first sleeve and the second sleeve in a direction causing disengagement of the first interlocker and the second interlocker by restoring a force against twisting,
    when a rotational load equal to or greater than a predetermined value is applied between the first ratchet and the second ratchet, the first ratchet and the second ratchet disengage as a result of the second sleeve moving away from the ratchet member against an urging force of the coil spring, and
    when the drive source is stopped, the second sleeve is able to idly rotate in a second direction opposite the first direction relative to the first sleeve by a circumferential distance corresponding to the rotation clearance formed between the first interlocker and the second interlocker by the urging force of the coil spring.

2. The rotational force transmission device according to claim 1, wherein,
    one of the first interlocker and the second interlocker is a protrusion extending along the axial direction of the rotary shaft and having a length in the circumferential direction of the rotary shaft equal to a first width,
    the other one of the first interlocker and the second interlocker is a groove extending along the axial direction of the rotary shaft and having a length in the circumferential direction of the rotary shaft equal to a second width, the second width being larger than the first width, and
    the coil spring further urges the first sleeve and the second sleeve to cause the protrusion to abut on one of two sides of the groove.

3. The rotational force transmission device according to claim 1, wherein,
    the first ratchet has a plurality of first tilt faces and a plurality of second tilt faces, the plurality of first tilt faces being disposed at predetermined intervals along the circumferential direction of the rotary shaft and tilting by a first tilt angle to the axial direction of the rotary shaft, the plurality of second tilt faces being disposed between the plurality of first tilt faces and tilting by a second tilt angle to the axial direction of the rotary shaft, the second tilt angle being larger than the first tilt angle, and the second ratchet has a plurality of third tilt faces and a plurality of fourth tilt faces, the plurality of third tilt faces tilting by the first tilt angle to the axial direction of the rotary shaft and engaging with the plurality of first tilt faces, respectively, the plurality of fourth tilt faces tilting by the second tilt angle to the axial direction of the rotary shaft and engaging with the plurality of second tilt faces, respectively.

4. The rotational force transmission device according to claim 3, wherein the first tilt angle is within a range of 2 to 15 degrees, both inclusive.

5. The rotational force transmission device according to claim 1, wherein, the first sleeve comprises a first restrictor abutting on a first end of a wire rod defining the coil spring in the circumferential direction of the rotary shaft to restrict a circumferential position of the first end, and the second sleeve comprises a second restrictor abutting on a second end of the wire rod defining the coil spring to restrict a circumferential position of the second end.

6. The rotational force transmission device according to claim 1, wherein the rotation clearance between the first interlocker and the second interlocker is equivalent to at least one pitch and no more than three pitches of the second gear.

7. An image forming apparatus comprising:

the rotational force transmission device according to claim 1 disposed on a body of the image forming apparatus; and a fusing unit removably disposed in the body and receiving a rotational force from the rotational force transmission device.

* * * * *